United States Patent [19]

Jeffrey

[11] Patent Number: 4,520,885
[45] Date of Patent: Jun. 4, 1985

[54] LOAD SENSING APPARATUS WITH CAPACITIVE AND INDUCTIVE SENSORS

[75] Inventor: Peter Jeffrey, Liverpool, England

[73] Assignee: Yoshida Kogyo K.K., Tokyo, Japan

[21] Appl. No.: 405,488

[22] Filed: Aug. 5, 1982

[30] Foreign Application Priority Data

Aug. 5, 1981 [GB] United Kingdom ............... 8123898

[51] Int. Cl.³ .................... G01G 3/00; G01G 7/06
[52] U.S. Cl. .................... 177/210 C; 340/935; 346/33 D; 361/283
[58] Field of Search ............... 177/210 C; 361/283, 361/312, 311; 346/33 D; 340/917, 933, 935, 941

[56] References Cited

U.S. PATENT DOCUMENTS

| | | | |
|---|---|---|---|
| 2,892,139 | 6/1959 | Salzberg | 361/312 |
| 3,167,381 | 1/1965 | Wick et al. | 346/33 D |
| 3,745,450 | 7/1973 | Wilt | 340/39 |
| 4,102,422 | 7/1978 | Christiansson | 177/210 C |
| 4,201,908 | 5/1980 | Johnson et al. | 340/38 R |
| 4,266,263 | 5/1981 | Haberl et al. | 177/210 C X |
| 4,351,746 | 9/1982 | Parish et al. | 361/311 |
| 4,437,138 | 3/1984 | Nicol | 361/283 |

OTHER PUBLICATIONS

*Condensed Chemical Dictionary*, 9th Edition, Van Nostrand Reinhold Company, New York, pp. 212–213.
Von Hippel, A. R., editor, Dielectric Materials and Applications, Technology Press and John Wiley & Sons, pp. 226–227.
Hill, *Electronics in Engineering*, 2nd Edition, McGraw-Hill, New York, 1961, pp. 293–294.

Primary Examiner—E. A. Goldberg
Assistant Examiner—P. Foster
Attorney, Agent, or Firm—William A. Drucker

[57] ABSTRACT

A load-sensing mat comprising a pair of superposed spaced capacitance plates held together in a mat by resilient material. The load-sensing mat also contains a conductive loop for inductance dependent load detection.

19 Claims, 5 Drawing Figures

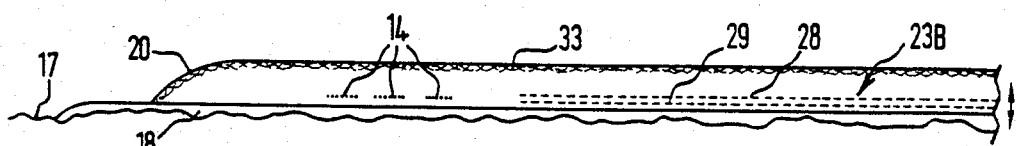
FIG.3.
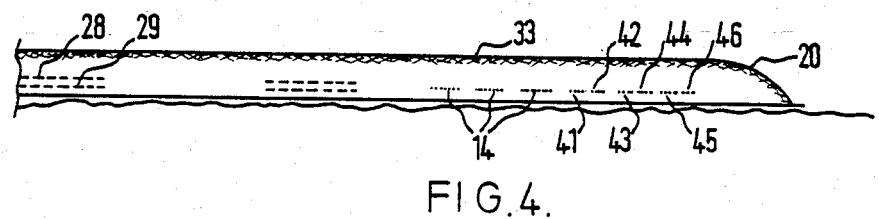
FIG.4.
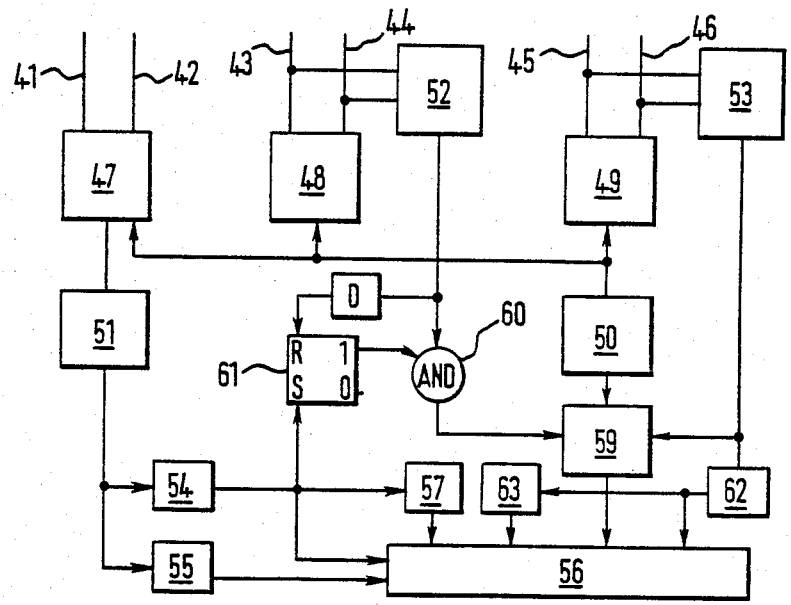
FIG.5.
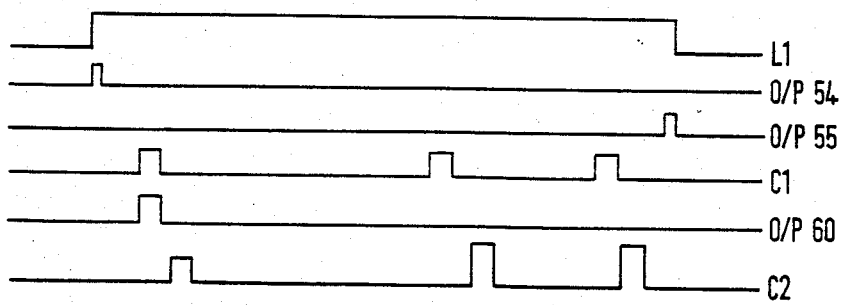

LOAD SENSING APPARATUS WITH CAPACITIVE AND INDUCTIVE SENSORS

The invention relates to load-sensing apparatus whether for monitoring traffic, for example motor vehicles on roads, or otherwise, say within factories, workshops or elsewhere.

According to one aspect of the invention there is provided a load-sensing mat comprising a pair of superposed spaced substantially planar conductive elements held together in the mat by resilient material so that said elements constitute capacitance plates via which electrical signals change according to whether or not the mat is loaded so as to compress the resilient material and thus vary the spacing of the capacitance plates.

The invention was first concerned in relation to assessing road usage and loading in such usage, which is of interest to many people including those concerned with planning new roads or modifying traffic flows, and those concerned with laying down specifications for road construction, maintenance and surfacing. Inductive loops of electrical conductors cut into the road, or pneumatic tubes stretched across the road, are well known for assessing the number of vehicles using a road.

Accordingly, a traffic transducer was devised comprising a flexible mat capable of ready securement to a road surface, such mat incorporating, as embedments therein, electrical conductor means constituting two separate sensing means that are advantageously one a loop for providing an inductance-dependent indication of vehicle presence and the other electrical capacitance means for providing an indication of each axle, preferably of axle weight. Otherwise, two capacitance means spaced across the mat width will afford direction information as well as axle counting, if not weight, from one or the other capacitance means.

However, much wide application to presence and pressure-sensing in relation to loads generally is now envisaged. It is believed that later description of specific mats as traffic transducers will nonetheless readily allow those skilled in the art to appreciate the wider applications of the invention.

Inductance loop and capacitance plate provisions of mats hereof enable load presence and weight or loading to be measured from one and the same mat, and, at least for a traffic mat, best response signal amplitude correlation with axle weight is obtained if a set of opposed capacitance plates are of sufficient width to take a full tyre imprint.

Mats hereof can also enable accurate determination of load speed by way of a second capacitance plate arrangement spaced from that above-mentioned across the width of a mat. The second capacitance plate arrangement may, with advantage, be provided, and the mat laid, to be encountered by a load passing over the mat before the first-mentioned plate arrangement. Furthermore, such a second capacitance plate arrangement need be only a fraction of the width of that first-mentioned and serves to provide a short response pulse from which an interval of time can be measured, for example by counting, before response from the first-mentioned capacitance plate arrangement. That interval of time clearly represents velocity.

For vehicle traffic information responses from the first-mentioned capacitance plate arrangement will normally be processed for each vehicle axis and summed for an overall vehicle weight.

In a specific and advantageous embodiment of load-sensing mat hereof, and inductance loop conductor means follows a course within relatively edge-adjacent portions of the mat and circumscribes the location of the or all capacitance plate arrangements thereof. Provision is conveniently made for connection of all leads from the mat to processing circuitry, to be at substantially the same location on the edge of the mat.

The mat is conveniently of resilient material that affords dielectric properties between spaced superposed metal layers, for example of fine steel mesh, constituting capacitance plates, and that further encapsulates such superposed metal layers together with any desired inductance loop conductor arrangements in an outer sheath. Skid resistance is increased by incorporating a fine aggregate into the upper surface of the outer sheath.

Investigations of suitable materials indicate that it is advisable for material between the capacitance plates to have some electrical conductance, say by incorporating a proportion of conductive filler, such as carbon (usually carbon powder or granules), but not in the overall encapsulating material. Then, a particularly advantageous proportioning of signal output amplitude to track load arises from, effectively, sensing a desired combination of conductance and reactance (capacitance). Such mats have many uses beyond road traffic monitoring. Particularly stringent requirements are set for road traffic monitoring by way of achieving satisfactory wear-properties on a road, avoiding untrackable variations of electrical properties with temperature, and affording fairly simple manufacture. Materials that have disadvantages as capacitive plate spacers include pitch epoxy resins, polyvinyl chlorides and synthetic rubbers, which tend to be rather temperature sensitive, and synthetic foamed plastics materials including polyurethanes, polystyrenes and polythenes that tend to break down physically. Problems have also been encountered in achieving satisfactory bonding between dissimilar materials, for example synthetic rubber as spacers and immediate encapsulation for the capacitive plates and a pitch epoxy resin outer sheath. A satisfactory structure has resulted from using natural rubber latex throughout and another aspect of this invention applicable to any mat incorporating capacitance plates thus comprises the use of conductive fillers, such as carbon, in natural rubber latex material (or other suitable material) for spacing of capacitance plates, preferably also with a net or mesh of non-conductive material, for example a suitable plastics material, such as nylon, in the spacer material. Such a net or mesh serves as a production aid in building up the spacer material and has also been observed to improve electrical properties. Moreover, non-conductive fillers, such as clay, serve in the same basic material as used for the outer sheath. Most satisfactorily, manufacture is reasonably trouble-free for natural rubber latex as all such materials can be introduced in emulsified form and then snap-cured, usually sequentially or individually.

A preformed inner layer for spacing the capacitance plates can have the latter (and any inductance loop conductors) bonded thereto, normally using a version of the same base material for compatibility, and then the outer sheath will be applied. The bonding material can differ as to any conductive filler content in order to match achieved conductance to particular requirements.

Practical implementation of the invention will now be described, by way of example, with reference to the accompanying drawings, in which:

FIGS. 3 and 4 are sections on lines A—A and B—B of FIG. 2; and

FIG. 5 is a block diagram of signal processing circuitry.

Figure 1:
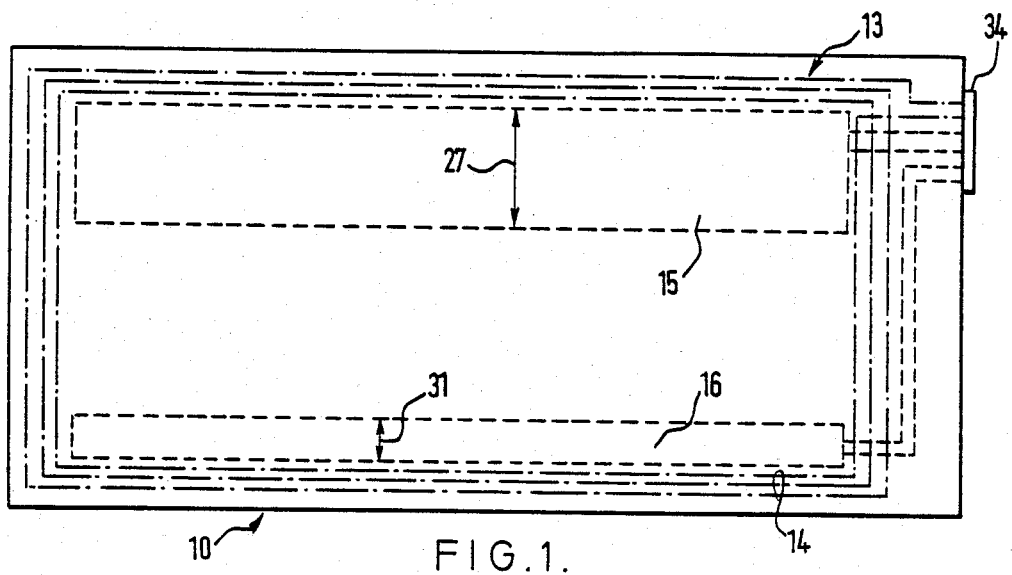
FIG. 1 is a plan view of a preferred traffic transducer mat hereof.

In FIG. 1, a mat 10 has a sensing arrangement 13 comprised of an inductive loop 14, and two sets of capacitive plates 15, 16 within the loop 14 embedded therein. The mat 10 is shown fixed to a road surface 17 via an adhesive levelling compound 18, such as pitch-extended epoxy resin. It will be appreciated that the same or other means may be used to install a mat for application other than to roads.

Figure 2:
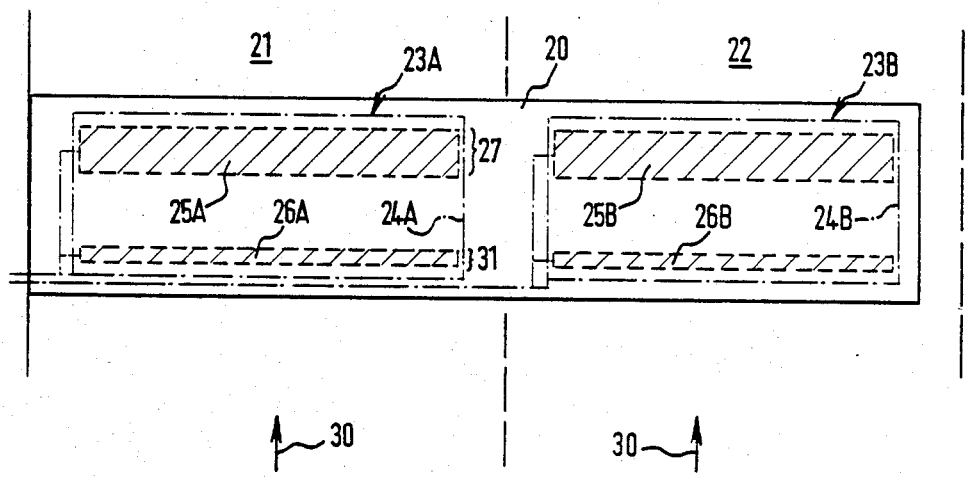
FIG. 2 shows a "two-lane" version of the traffic transducer mat of FIG. 1.

In FIGS. 2 to 4, a mat 20 is shown laid across two lanes 21, 22 of a road and having separate sensing arrangements 23A, 23B for each lane and each similar to that 13 of FIG. 1. The sensing arrangements include inductance loop means 24A, 24B as embeded conductors. Each loop means actually includes three turns of embedded conductor, see 14 in FIG. 1 and also the section of FIG. 3, which may be of copper braid though, for overall strength, expanded stainless steel is advantageous and affords satisfactory operation.

The sensing arrangements 23A, 23B also include embedded capacitance plate means 25A, 25B (similar to that 15 of FIG. 1) that, for a traffic transducer mat, are of a sufficient width 27 to take a full tyre imprint at least for most vehicles. The capacitance plate means are also advantageously of stainless steel for strength and comprises spaced layers 28, 29 of fine mesh, typically woven metal fabric or expanded stainless steel between 10 and 250 microns thick.

Further capacitance plate means 26A, 26B (similar to 16 in FIG. 1) spaced from those 25A, 25B has a similar construction but, as shown, is of much less width 31. For traffic or other loads moving in the direction of arrows 30, the further capacitance plate means 26A, 26B will usually be encountered before the first 25A, 25B as will be discussed below.

The inductance loop conductors and capacitive plates are embedments in a suitable flexible resilient material that is impregnated 33 at and near its upper surface with a suitable fine aggregate for skid-resistance. The loop conductors and capacitance plates are advantageously at different levels with extensions thereof brought to a single connection position 34 that may conveniently include a separate incorporated connector part for each sensing arrangement, plug-and-socket fashion, relative to leads therefrom to electronic circuitry.

To avoid response signal clutter for a multi-axle vehicle, or closely successive or multiple element loads it is convenient to arrange that response signals from the second capacitance plate arrangement are blocked or ignored after the first said response pulse, say corresponding to the first axle of a vehicle or first load element, until inductance loop response indicates that the vehicle or other load or set of loads has cleared the mat. Any or all of information concerning load presence, direction of travel, speed, number elements (e.g. of axles), individual element (e.g. axle) weights, and total load (e.g. vehicle) weight can readily be derived from mats hereof with inductance and two capacitance provisions.

It will be appreciated that mats hereof may have but one sensing arrangement as in FIG. 1 or more than two thereof and that at least one such sensing arrangement may be opposite relative to another in respect of its capacitance plate means so as, in traffic monitoring applications, similarly to service road lanes for opposite traffic flows. For other applications, of course, appropriate provisions need not extend beyond one pair of capacitance plates, but could do so if desired.

It will be clear at least from FIG. 1 that some crossings of leads or tails will be required in a preferred mat hereof, if only to cross the inductor loop turns. That can be aided, see FIGS. 3 and 4, by the indicated different depths or levels for the capacitance plates and the inductor loop turns. However, whereover cross-overs are required, it is preferred to ensure that there is no electrical contact by interposing small plates of insulating material, typically 500 microns thick and 50 mm square. The indicated, or other preferred embedment depth differences may be maintained for leads and tails rather than as shown in FIG. 4, having them all traverse at the same level once brought to an edge portion of the mat.

Using suitable energisation and detection circuitry, it will be appreciated that the preferred sensing arrangement of a mat hereof will serve by its inductance loop means to indicate vehicle or load presence, produce a pulse signal for at least the first axle of a vehicle or first load element from its further capacitance means, and produce an amplitude significant signal proportional to weight for each axle or load element from its first capacitance means. From said pulse signal and the first amplitude-significant signal an indication of vehicle or other load speed is readily derived according to the interval therebetween. Also, summation of the amplitude signals for each axle of a vehicle or load element is readily achieved for indicating total vehicle or load weights.

Turning now to the block circuit diagram of FIG. 4, specifically for a traffic sensing system, leads 41, 42 are for the inductance loop means, and leads 43, 44 and 45, 46 serve the first and second capacitance plate means, leads 44 and 46 being earth reference. Separate signal generators 47, 48, 49 (usually for sine wave oscillating signals) are shown for loop inductance and the two capacitance means. Rather than using individual oscillators, it will usually be convenient to derive suitable frequency signals from a clock pulse source 50 via dividing logic and sine wave shaping circuitry as generators 47, 48, 49.

Detectors 51, 52, 53 are shown for loop inductance means and the two capacitance means, respectively. Loop inductance detector 51 will produce an envelope signal L1 from which leading and trailing edge detectors and pulse generators 54, 55 are shown. Output from 54 indicates vehicle presence and can be used to advance data recording means 56 if necessary and to operate an accumulative counter 57 if required. Output from 55 can be used to staticise data by centering it to the recording means for each vehicle.

Detector 52 for first capacitance means 25 produces an output pulse C1 that starts speed counter 59 for response to clock pulses from source 50. Only the pulse corresponding to the first vehicle axle is used for this purpose subsequent pulses being blocked by AND gate 60 enabled via bistable 61 at the leading edge of the loop detector envelope and disabled by a delayed version of the output of 54 or delayed response of the bistable 61.

Detector 53 for second capacitive means 26 detects maximum amplitude of each response thereto and stops the speed counter 59. Outputs C2 from detector 53 will be timespaced, one for each axle, and are successively applied to an analog-to-digital converter 62 whose outputs are successively recorded and also accummulated at 63 for subsequent recording as a measure of total vehicle weight.

It will be clear that a mat with no inductance loop but two capacitance plate arrangements can afford at least total axle counting, if not also axle weights, and speed information correlation to vehicle counting may well be feasible, though a mat with inductance loop means and one capacitance plate arrangement would assure that, and could provide speed data. Best speed data arises from the use of spaced capacitance arrangements, which also provide directional information.

In addition to aspects of the invention referred to above and concerning two or more sensing elements to each mat, we do not envisage the use of mats that have but one sensing element, whether inductive or capacitive, but particularly the latter. Then, individual, single-sensing element mats can be disposed at predetermined spacings in order to afford speed/direction information. Also, individual mats could be located alone or in groups, say spaced pairs at intervals, to give information concerning traffic/load flows including hold-ups. Such systems may, if desired by linked directly to traffic (or load) control signals, such as recommended speed indicators. Furthermore, individual mats hereof may be employed at robot traffic signals as vehicle sensors.

Common to implementing all aspects of the present invention is the advantage to be gained from use of a thin mat, say about 3 mm thick (with FIGS. 3 and 4 being substantially to scale for spacings), that is readily laid down on a road or other surface, say secured thereto satisfactorily by a suitable adhesive that can also serve as a leveller for the road or other surface below the mat.

Such mats may be of multi-layer bonded type, with resilient insulating material above, below and between appropriate conductive layers, or even of an integral moulded type. It is, however, found to be particularly advantageous for a layer intermediate capacitive plate arrangements to have relatively enhanced dielectric properties compared with top and bottom layers of the mat. That is particularly so where conventional fillers for the top and bottom layers are used, typically clay, calcium carbonate and silica together with suitable pigment. Then, a carbon-black filled intermediate layer has been found to be advantageous. So called "anti-static neoprene" is suitable.

It is preferred that any such intermediate layer of different characteristics to the outer layer of the mat shall be compatible with those outer layers in the sense that they will hot-bond together without special application of adhesives or solvents. That is the case using the same base material for all, for example natural rubber latex.

A particularly preferred manufacturing process comprises the steps of hot-bonding conductive patterns directly to a said intermediate layer (to both sides for capacitive arrangements) and then passing that layer as a web between upper and lower extruders for the top and bottom layers to form immediate direct bonds therewith. Hot-extrusion enables anti-skid material to be metered onto the top surface and enter the upper part of the top layer, say from a drum with an expanded metal or otherwise plurally indented surface to take particulate material, for example calcined bauxite, from a feed hopper to the mat surface. A later suction stage enables loose anti-skid material to be reclaimed and returned to the feed hopper.

Good results have been found from setting conductive arrangements in the lower half of the thickness of the mat.

Finally, more detail is given of the forementioned aspect of the invention that proposes the use of conductive materials for the mat, between capacitance plates, specifically natural rubber latex. In this connection, spacer material between the capacitance plates has incorporated therein a plastics, usually nylon, net or mesh and carbon-black. It is now postulated that workable percentages for carbon-black range from trace to 25%, usually 5% to 20% according to the area, particularly width, of the capacitance plates, and enabling use of standard and electronic detection circuitry. Bonding thereto of the preferred expanded stainless steel capacitance plates, is usefully by a natural rubber latex having a relatively adjusted content of conductive filler, specifically a substantially lesser amount, say one-tenth of that between the plates at least for larger amounts in the latter, e.g. the above-mentioned 5 to 20%. Final total encapsulation is within further natural rubber latex, this time with an electrically inert filler such as a clay, for example china clay, in a content of 40% with a postulated workable range of 10% to 80%. All percentages above given are on the basis of weight.

Reverting to the hot-bond process described above, it will be appreciated that a bondable coating for the capacitance plates may be achieved by immersion in an additional process step prior to being put on a preferred spacer, though the latter could be built up on one of the coated plates if preferred.

Concerning the non-conducting mesh, nylon of 3 to 4 mm apertures using 0.3 to 0.5 mm strand diameter, has been found to enhance electrical properties, even produce asymmetrical properties when closer to, actually contacting, one of the capacitance plates.

I claim:

1. A load-sensing mat comprising:
   (a) at least one pair of superposed spaced, substantially planar conductive elements embedded in the mat by a flexible resilient material, said pair of conductive elements constituting capacitance plates operative to produce an electric signal in response to the spacing between said capacitance plates when the mat is loaded to compress said resilient material; and
   (b) a conductive loop embeded in the mat by said flexible resilient material for providing an inductance-dependent indication of the presence of a load, said conductive loop being disposed around said capacitance plates.

2. A load-sensing mat according to claim 1 said capacitance plates and said conductive loop being disposed in a lower half of the thickness of the mat.

3. A load-sensing mat according to claim 1, said capacitance plates and said conductive loop being embeded at different levels.

4. A load-sensing mat according to claim 1, two said pairs of said capacitance plates being disposed inside said conductive loop in spaced apart relation across the width of the mat.

5. A load-sensing mat according to claim 4, said two pairs of capacitance plates having different widths.

6. A load-sensing mat according to claim 1, said resilient material being impregnated at and near its upper surface with anti-skid material.

7. A load-sensing mat according to claim 6, said anti-skid material comprising a fine aggregate.

8. A load-sensing mat according to claim 1, said resilient material comprising natural rubber latex and having an intermediate portion disposed between said capacitance plates, said intermediate portion being filled therein conductive fillers of carbon-black and a non-conductive plastic mesh penetrated by said natural rubber latex.

9. A load-sensing mat according to claim 8, wherein the resilient material immediately adjacent to and bonding the capacitance plates is of reduced conductive filler content.

10. A load-sensing mat according to claim 8, said intermediate portion including 5% to 25% by weight carbon-black content.

11. A load-sensing mat according to claim 8, said plastic mesh having a strand diameter of 0.3 to 0.5 mm and apertures of 3 to 4 mm.

12. A load-sensing mat according to claim 8, said resilient material further having an upper portion disposed above an upper one of said pair of capacitance plates, said upper portion being substantially electrically non-conductive.

13. A load-sensing mat according to claim 12, wherein the encapsulating resilient material has an electrically inert filler.

14. A load-sensing mat according to claim 13, wherein the inert filler is clay.

15. A load-sensing mat according to claim 14 with claim 2, wherein the clay is present in about 40% by weight.

16. A load-sensing mat according to claim 1, wherein the capacitance plates comprise apertured or expanded metal penetrated by the resilient material for bonding purposes.

17. A load-sensing mat according to claim 16, wherein the capacitance plates comprise metal mesh.

18. A load-sensing mat according to claim 10, wherein the metal mesh is of woven construction.

19. A load-sensing mat according to claim 8, wherein the metal is stainless steel.

* * * * *